Figure 1:
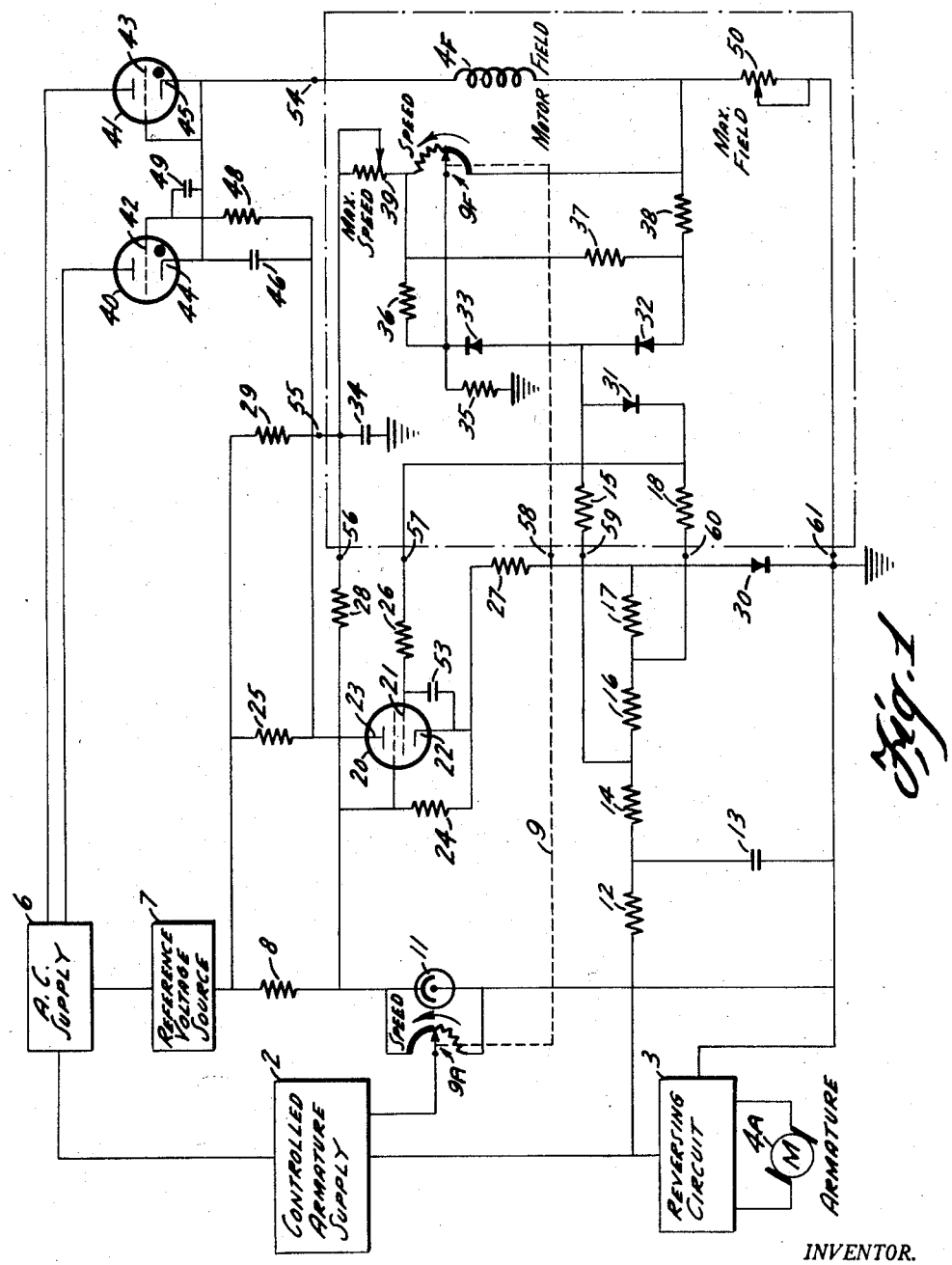

INVENTOR.
ERNEST G. ANGER
BY Myron J. Seibold

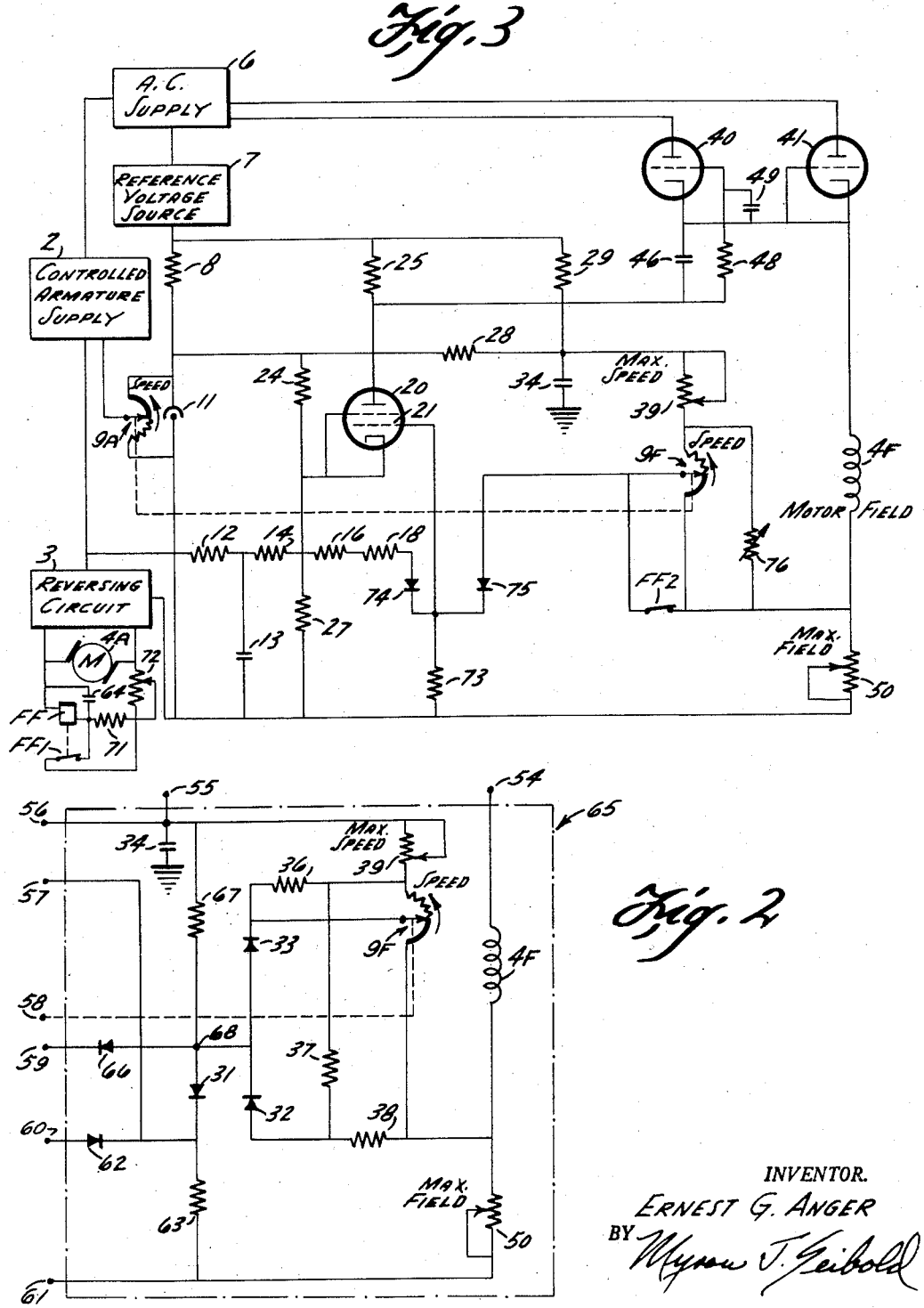

United States Patent Office 2,855,555
Patented Oct. 7, 1958

2,855,555

MOTOR CONTROL CIRCUITS

Ernest G. Anger, Wauwatosa, Wis., assignor to Square D Company, Detroit, Mich., a corporation of Michigan Application May 10, 1956, Serial No. 584,018

13 Claims. (Cl. 318—397)

The present invention relates to motor control circuits and more particularly, to motor control circuits for performing control functions in a predetermined sequence and manner to maintain maximum torque during acceleration and provide other desirable operating conditions.

The motor control circuit is in a group of systems which serve to control, in some predetermined manner, the electric power delivered to the apparatus to which it is connected. In controlling or governing the power applied to the motor it is necessary to consider the armature and field windings individually to perform the functions desired in the most efficient manner. Each winding is arranged to monitor its own power in a continuous manner by its individual control circuit, but interdependent upon the power applied to the other winding to determine its operating condition. For maximum acceleration and torque the rated field current must be present in the field winding until the voltage across the armature winding has reached its rated value.

The sequence of operation of acceleration therefore is to increase the armature voltage to as near rated value as is practical with full field current and then to proceed to a speed above the base speed of the motor by decreasing the current in the field winding below its rated value. In the same system a rapid deceleration or reversal of armature rotation requires that the increase in field current be controlled to prevent the voltage generated in the armature from exceeding the safe limits of its winding. It is an object, therefore, of this invention to provide a simple and more efficient circuit for performing the aforesaid control functions.

Another object of the present invention is to provide a method of sequencing the control of the armature and field windings in an electrodynamic machine by deriving a voltage which is a function of the winding voltages and adding a control voltage to decrease the current or voltage applied to one winding at a predetermined voltage of the other winding.

A further object of the invention is to provide a method of controlling the voltage applied to the windings in an electrodynamic machine by inserting an additional control voltage in the control circuit of one winding at a predetermined voltage of the other winding.

Still another object of the invention is the provision of a system for control of dynamoelectric machines in which the sequence of control for the most efficient operation is determined by the voltage across one winding selecting alternate current paths to the control circuit of the other winding.

A still further object of the present invention is to provide a motor control circuit in which the transfer from armature to field regulation is provided through alternate current paths between the field and regulator wherein one of said paths includes variable control voltage and the path is selected by a signal from the armature winding.

A further object of the invention is the provision of a relay across the armature sensitive to armature voltage for opening one or two alternate current paths connecting the field feedback voltage to its regulator circuit.

Still another object is to provide a circuit coupling the armature voltage to the field regulator circuit to control the field current when the armature voltage reaches its minimum safe voltage limits.

A further object is to provide a circuit for coupling a signal which is a function of armature voltage to the field regulator circuit without introducing transient armature voltages into the field regulator circuit.

Further objects and features of the invention will be readily apparent to those skilled in the art from the specification and appended drawing illustrating certain preferred embodiments in which:

Figure 1 is a circuit diagram of a preferred embodiment of the invention; Figure 2 is a modification of the transfer circuit of Figure 1, and Figure 3 is a circuit diagram of a modification of the control circuit of Figure 1.

Referring now to the drawings, wherein like reference characters designate like or corresponding parts throughout the several views, there is shown in Fig. 1 which illustrates a preferred embodiment, a controlled armature supply 2, which may include a feedback or closed cycle control circuit for the motor armature 4A, connected to a reference voltage including a voltage regulator tube 11 which is variable by the speed control potentiometer section 9A, and a reversing circuit for reversing the polarity of the armature supply including a switch or contactor connected to the armature and the output of the controlled supply 2.

The motor control circuit provides a complete range in adjustment of armature and field speed ranges preferably by a single speed dial connected to a dual potentiometer, which may be coupled by a mechanical linkage 9, having armature and field speed control sections coupled in tandem for sequentially varying the resistance over respective halves of the dial rotation and providing zero resistance over the remaining portions by connecting the respective sections to the armature and field regulating circuits to incur full power utilization of the motor.

Referring more particularly to the adjustable field supply, rectifiers or thyratrons 40 and 41 may be arranged for diametric connection to the motor A. C. supply source 6 to provide a full-wave controllable rectified voltage to the motor field. Only one of the pair of rectifiers 40 need be coupled to the field regulating circuit wherein the rectified output of both tubes may be controlled by the regulating signal applied to one of the grids, e. g., grid 42 of the tube 40 as illustrated in the drawings. In this instance, rectifier 41 has been shown having its grid 43 grounded and operating as an uncontrolled diode and since the load, i. e., the motor field, is highly inductive in nature, full firing of rectifier 41 cannot result in a considerable rise in field current during the half cycle applied to this tube from the A. C. supply 6.

A delayed action relay may be included in series with the field which will close the circuit only after the rectifier filaments have properly warmed. A field loss relay coil connected in series with the field is contemplated where the critical nature of the application indicates this need. Also included in series with the field 4F is a potentiometer 50, regulating the maximum current in the motor field winding 4F, and coupled to the regulating circuit to provide a field regulating feedback voltage.

Basically the regulating circuit of the motor field is of the feedback or closed cycle control type in which the voltage drop across the resistor element of the maximum field potentiometer 50 provides a feedback signal voltage which is a measure of field current. The field voltage reference may comprise a voltage divider including resistors 24 and 27 connected in series across the voltage regulator tube 11, and to the cathode of amplifier or regulator tube 20 at the junction of said resistors. Since the feedback voltage of the field is coupled to the grid of the amplifier 20, the change in magnitude of the output is a measurement of the error between reference and feedback.

The error sensed by the tube 20 controls plate voltage which is coupled to the grid 42 of the rectifier 40 to control the current in the motor field 4F. The grid of the rectifier 40 is coupled to the highest voltage tap of the unregulated reference voltage supply 7 through the voltage dropping resistor 25 wherein the level of the D. C. voltage is adjusted by the conduction of the amplifier 20 whose plate resistance, in combination with resistor 25, forms a controllable voltage divider having a field control signal voltage output coupled to the grid of the rectifier 40 through the current limiting resistor 48.

An A. C. signal component is also present on the grid 42 which is produced by the conduction of rectifiers 49 and 41 wherein the A. C. component comprises the 120 cycle ripple conducted through the ground bus, A. C. supply 6, resistor 25 and the amplifier 20. The A. C. component is shifted in phase by capacitor 46, connected to the cathode of the rectifier 40, to provide the necessary RC time constant in combination with the transmitting resistor path referred to above. Capacitor 49 is shown connected between the grid 42 and the cathodes 44 and 45 for filtering high frequency voltage surges which may be electrostatically coupled to the grid from other thyratrons.

By controlling the D. C. component of the grid signal which is superimposed on the phased-back A. C. signal, the required range of field current conduction is provided in which the A. C. component produces a rising grid voltage wave slope whose intersection with the critical grid voltage characteristic of the rectifier 40 is controlled by the D. C. signal voltage component, which in turn, is determined by the conduction of the field regulator tube 20; to shift the phase of the firing point of the rectifier 40. A fail safe control arrangement of the field supply is provided inherently in this circuit wherein loss of conduction of the amplifier will permit the reference supply voltage applied to the grid to shift the phase of the firing point to turn the rectifier on fully, whereby maximum field current is provided for minimum motor speed within the control of the field regulator.

Full power utilization of the motor requires rated field current at or below base speeds. Regulation of the field current therefore at full value is maintained by the field current passing through the resistor element of the potentiometer 50 wherein the voltage developed across the resistor element is taken across the tapped portion of the resistor element of potentiometer 50, supplying a field current feedback signal voltage to the grid of the amplifier tube 20 through resistor 38, rectifiers 32 and 31. The regulator circuit may be adjusted whereby the feedback voltage at the grid 21 will limit the conduction of the amplifier tube 20 to a value which will maintain the superimposed D. C. voltage on the grid of the thyratron, to regulate the field supply voltage for full motor field current or rated motor field current.

Other conditions require regulation of field current at values below rated field current. Of these, one of the most important is regulating the motor to a speed higher than base speed wherein a speed reference is provided by the field speed potentiometer section 9F connected to the reference voltage source 7, through the maximum speed potentiometer 39, and voltage dropping resistors 28 and 8. The movable tap of the potentiometer 9F is mechanically coupled in tandem with the movable tap of the armature speed potentiometer and to the speed dial; and connected to the grid of the amplifier tube 20 through rectifiers 33 and 31 and current limiting resistor 26. The field current is regulated to rated value by the feedback from potentiometer 50 alone. However, upon setting the speed dial for higher than rated speeds, the movable tap of potentiometer 9F, in the active or resistive upper portion of its element, adds a portion of the control voltage to the feedback voltage taken from potentiometer 50 and applies it to the grid of amplifier 20 decreasing the field current to the amount calibrated by the new setting of the speed potentiometer 9F.

*Acceleration*

The armature and field regulating circuits must be properly sequenced to provide full power utilization of the motor during acceleration by maintaining the rated motor field current until speeds are required above rated base speed even though potentiometer 9F were set to produce a decreased field. A transfer circuit has been provided for proper sequencing in which the voltage divider including resistors 12, 14, 16 and 17 supply a reference armature voltage to the transfer circuit changing control to the field upon the armature reaching a predetermined voltage, preferably near the base speed voltage. The current, through resistor 15 connected to a point between resistors 14 and 16 of the voltage divider and to the grid of the amplifier tube 20, decreases with increasing armature voltage until equalling the field feedback voltage and operating level of the grid of the amplifier 20.

In the present embodiment, it was desired that the armature voltage reference divider supply grid bias operating voltage at 90% of the rated armature voltage in determining the control transfer point of the circuit. As will be seen from a further description, the transfer circuit including rectifiers 31—33, transfers motor control from simple field voltage feedback to a composite feedback signal to the regulator tube 20, including both the field feedback voltage and a portion of the speed control voltage taken off the tap of the speed potentiometer section 9F.

The major portion of the transfer circuit is included in the network including the field speed potentiometer 9F, rectifiers 31—33, voltage divider network including resistors 37 and 38 and resistors 35 and 36. Rectifier 31 conducts continuously during normal operation of the control system wherein the voltage at the junction of resistors 16 and 17 of the armature voltage divider is below the operating potential of amplifier 20 at the plate of the rectifier 31 and producing current flow through the resistor 18; therefore, rectifier 31 may be considered a normally closed switch having its contacts in closed position. Rectifiers 32 and 33 operate as though they were normally open and normally closed contacts respectively, of a voltage sensitive relay having its coil connected across the motor armature and adjusted to operate upon the armature voltage reaching near rated value. The rectifiers operate in this manner by connecting the loading resistor 15 at the junction of resistors 14 and 16 where the armature voltage divider adjustment provides a signal operating level slightly greater than the operating level of the grid 21 at rated armature voltage.

Before the armature reaches the transfer point, near rated armature voltage, rectifier 32 conducts and loading current is drawn through resistors 18 and 15 with the field feedback voltage providing a source. Rectifier 33 remains blocked off and rectifier 32 remains conducting until the voltage in the resistors 14 and 16 of the armature voltage divider exceeds the feedback voltage, whereupon speed control transfers from the armature to the field, and the current through resistor 15 reverses, rectifier 32 blocks off and rectifier 33 conducts, completing the circuit from the armature voltage divider to the potentiometer 50 through the speed potentiometer 9F. Since the field feedback loop through rectifier 32 is now blocked and amplifier 20 can no longer regulate to the full field current, the rising positive signal voltage from the armature voltage divider transmitted by resistor 15, raises the voltage on the grid 21, through the obvious connection to the grid 21 through the rectifier 31; the rising voltage on the grid increases the conduction of the amplifier 20 and lowers the D. C. signal on the grid of the rectifier 40 decreasing the conduction and resulting field supply voltage and current to the decreased value corresponding to the setting of potentiometer 9F.

Continuing the sequential operation from the transfer point, the speed of the motor is increased by further rotation of the speed dial, whereupon the tap of the field control tandem section of the speed potentiometer engages the active second half of the resistor section. The portion of the resistor included in the feedback circuit adds a positive bias voltage to the rectifier 33 from the reference supply but limits the transient rise of the grid potential of the amplifier 20 to the drop in potential of the field feedback voltage resulting from the decrease in field current through the portion of the resistor element of potentiometer 50 in series with the field. Therefore, due to rise in armature voltage past the transfer point, the amplifier or current regulator tube 20 is switched to the lower regulated output of the motor field from rated field current, as adjusted by the rotation of the speed potentiometer. During acceleration of the drive, regardless of the preset speed dial setting, full field may be maintained on the motor until the armature voltage has reached the transfer point near its rated base value.

To minimize unwanted change of field current at the transfer point, before the speed dial has reached the center position and has not engaged the resistor element of the potentiometer 9F, an initial positive bias voltage is applied to rectifier 32 by a voltage divider including resistors 37 and 38, connected across the speed potentiometer section 9F. The positive bias voltage may be adjusted to an amount approximately equal to the combined voltage drops of rectifiers 32 and 33 for the loading produced by resistors 15 and 18. The feedback circuit may then transfer from rectifier 32 to rectifier 33 without an appreciable change of field current and field control does not begin until the potentiometer has been moved into the active second half of its resistor element. A similar operation but in reverse sequence is produced when the speed potentiometer setting is decreased gradually by manual control back into the armature control range in a smooth transition.

Since the motor control circuit must regulate the flow of power into the motor under all conditions of manipulation of the speed dial and/or control buttons, to provide acceleration in the least possible time without injury to the controller or motor; acceleration in the armature control region may be accomplished by current limit control provided in the controlled armature supply section 2, while the field controller maintains full rated motor field flux. Acceleration control in the field regulator is limited by the time delays of the regulating circuit including the highly inductive motor field and the filter circuit, including resistors 26, capacitor 53 coupling the feedback signal to the amplifier 20.

*Deceleration*

Deceleration of the motor 4 over the wide range included by the armature and field control circuits requires additional regulation to prevent excess armature voltages. The grid 21 of the amplifier 20, is coupled to the armature voltage divider by resistor 18 at the junction of resistors 16 and 17. The voltage at this juncture or tap is adjusted to exceed the operating level of the amplifier grid when the armature voltage exceeds its rated value by a predetermined amount, usually the safe overvoltage limit. Should the speed dial be adjusted for a sudden deceleration with the motor operating at several times normal base speed in a field weakened condition, the resulting increase of field strength could cause an increase of motor generated counter E. M. F. to several times rated value which would continue until retardation of the motor speed by the driven load reduced this voltage to the proper value at the new operating speed. When the armature voltage exceeds a predetermined limit, the current through the resistor 18 reverses and rectifier 31 blocks off, similar to the opening of a switch, breaking the field feedback circuit controlling the amplifier 20.

The circuit from the armature voltage divider is then completed through resistor 18 to the grid of the amplifier 20 without interference from field feedback signals. The rate of deceleration and increase in field strength is therefore regulated by the armature voltage while the motor coasts or is retarded to the new lower operating speed, whereupon the drop in armature voltage to rated value reduces the voltage at the junction of resistors 16 and 17 of the voltage divider and the field feedback signal is conducted through rectifier 31 to control the amplifier 20 and field current; limiting the armature voltage is necessary to prevent flashover of the motor commutator or arcing the armature converter supply.

The stopping of the drive at high speeds with a weakened motor field involves the same problems as deceleration. No additional circuits have been shown to provide for this operation; however, it is conventional to provide a loop contactor which isolates the converter from the supply and a high voltage may be permitted by providing a braking resistor having limited braking current. The loading action of the dynamic braking resistor aids to reduce the voltage generated and the time delay action of the regulating circuit adds sufficient delay in the field strengthening to prevent excessive voltage rise before the motor has decelerated to a stop.

*Reversal*

Reversing the direction of the motor conventionally by the system referred to as "plug-through reversal" by operation of a reverse switch to change the direction of the motor without stopping; armature contactors in the reversing circuit 3, reverse the connection to the armature supply while the motor is coasting in a first direction. A period of automatic dynamic braking may first be introduced to decelerate the motor before reverse voltage is applied. When the reversing circuit 3 or reverse contactors operate, the armature supply, i. e., converter, will be subjected to a high voltage condition unless the motor field strength is substantially reduced.

The armature voltage limiting circuit includes rectifier 30 for reversal operation which is connected in series with the common return for the armature voltage divider and the field reference voltage divider including resistors 24 and 27. The reverse polarity signal applied to the armature voltage divider blocks off the rectifier 30 upon the voltage at resistor 17 reaching a predetermined negative value consistent with the maximum armature voltage desirable. Further increase of the armature voltage in a negative direction after the rectifier 30 has been blocked lowers the voltage on the cathode 22 whereupon conduction in the amplifier 20 increases, which, as we have seen before, decreases the field current. The resulting reduction in rate of the decrease in field current limits the strengthening of the field while the reversing armature voltage conduction continues and a delay circuit, normally included in the armature controller 2, permits conduction of the rectified power in the motor armature "plugging" the motor to a stop and then continuing to accelerate it in the reverse direction. As would be expected, as the armature voltage passes through zero the rectifier 30 resumes normal conduction and all regulating circuits of the field regulator will return to normal operation.

*Circuitry*

In the alternate field feedback circuit loop including the D. C. bias supplied by the speed potentiometer section 9F, a nonlinear inverse regulation of speed increase to field weakening results from the adjustment of the rotation of the speed potentiometer. To compensate for the nonlinearity, resistor 36 has been added to provide a parallel loading across the active section of the field speed potentiometer 9F which serves to increase the rate of signal voltage over the lower range of the active section of the potentiometer. Rotation of the speed dial in the field section would therefore tend to give a linear increase in speed with angular movement of the dial. An additional resistor 35 connected between the ground and the potentiometer tap or slider is necessary when logarithmic tapered potentiometers having a mid resistance value of the total resistance are used as a substitute for dual tandem potentiometers where the lower sectors occupying one-half of the section rotation has a zero resistance. The loading provided by resistor 35 serves to bring the midsetting output of the logarithmic potentiometer to approximately zero.

The standard armature controller provides no field supply regulation, therefore to minimize motor speed variations the armature reference supply is intentionally deregulated slightly to match the variations in motor field flux operating near full saturation. In the field regulating controller disclosed, in order to deregulate the field to match the deregulation designed into a standard armature controller, resistor 29 is connected to the unregulated reference voltage source 7 above resistor 8 to a point between resistor 28 and potentiometer 39 adding the unregulated component to the regulated voltage transmitted by resistor 28 to the speed control section of the transfer circuit. Increase in armature voltage would be matched by an increase in field voltage when the field potentiometer section 9F is in the active section of rotation, controlling the field current to maintain constant speed at a predetermined setting.

Capacitor 34 has been added connecting the junction of the unregulated and regulated voltage to the field controller to ground to filter out spurious armature voltages and ripple in the supply. Similarly capacitor 13 connects the voltage of resistors 12 and 14 of the armature voltage divider to ground to reduce spurious voltages.

Operation

In operation the motor 4 may be accelerated from the stop position by rotation of the speed dial 9 wherein the armature voltage is gradually built-up by rotation of the armature section 9A of the dual potentiometer, increasing the voltage across the motor armature 4A by decreasing the amount of voltage or positive bias inserted in the feedback circuit generally shown in the controlled armature supply 2. During this period of acceleration to near rated armature voltage or base speed, the motor field 4F is supplied with normal field voltage wherein the feedback provided by potentiometer 50 alone limits the bias on the grid of the amplifier 20 which in turn phases the critical grid voltage of the field supply rectifier 40 to provide normal field current to the field winding 4F. Having raised the speed of the motor to nearly normal base speed, the sliders of the potentiometer sections 9A and 9F are near the positions shown in Fig. 1 wherein further advancement of the speed dial will only decrease field current to further increase the speed.

At this point, however, the transfer circuit is in operation and must switch from simple field feedback to the combination of field feedback plus a variable D. C. bias provided by the regulated voltage across potentiometer section 9F. The tap between resistors 14 and 16 of the armature voltage divider through the connection including series resistor 15 provides an armature voltage reference substantially equalling the field feedback voltage.

Further increase of armature voltage blocks off rectifier 32 and the field feedback signal since the armature voltage fed to this point has been predetermined to exceed the normal field feedback signal. The common connection to the grid 21 of the amplifier 20 through rectifier 31 lowers the bias and increases the conduction of amplifier 20. The resulting decrease in plate voltage phases back the critical grid voltage of the supply rectifier 40, decreasing motor field current. The armature voltage signal in the transfer circuit supplied from the tap between resistors 14 and 16 is limited however, by the setting of the field section 9F of the potentiometer wherein the slider completes the circuit through the lower one-half of the potentiometer section and rectifier 33. The decrease in field current therefore will be limited to the setting of the field section of the potentiometer.

Subsequent rotation of the speed dial in a counter-clockwise direction positions the slider of section 9F in the active upper portion of the resistor element increasing the positive bias in the field feedback circuit raising the level of the grid of the amplifier 20. The plate circuit of the amplifier phases back the grid voltage, decreasing the field voltage. At this new setting the field feedback voltage derived from the portion of the resistor element of potentiometer 50 included in the field circuit is decreased by the D. C. bias added in the circuit by the potentiometer section 9F, the regulating circuit stabilizing at this new setting.

Assuming a portion of the resistor element of the potentiometer section 9F has been included by the slider and a sudden decrease in speed is called for by rotation of the slider to a lower speed; insufficient field feedback voltage will be available to balance the field regulator; the grid of the amplifier 20 will be momentarily lowered until the critical grid voltage for the rectifier 40 is phased ahead sufficiently to increase the field current, whereby the field feedback signal will increase the increment subtracted from the D. C. bias.

If the reduction in speed called for exceeds the deceleration rate of the motor as determined by the armature voltage, an armature feedback voltage is derived at a tap between the resistors 16 and 17 of the armature voltage divider which is connected to the grid of the amplifier 20 through series resistor 18. An increase in armature voltage beyond the safe desired limits at this lower tap will limit the rate of deceleration and apply an armature feedback signal higher than the field feedback signal, blocking rectifier 31, to limit the phasing ahead of the critical grid voltage of the field supply rectifier until the armature voltage has had sufficient time to adjust to the new and larger field current. The field voltage feedback signal will resume control when the armature voltage stabilizes or adjusts to the higher field current.

In the plug-through reversal operation, the negative signal at the end of the armature voltage divider blocks the rectifier 30 by applying a negative voltage on the plate, this negative voltage being predetermined consistent with the maximum armature voltage desirable. A further increase of armature voltage, in a negative direction, after blocking rectifier 30 lowers the voltage on the cathode 22, increases amplifier conduction, limiting the rate of increase of field current. As the armature voltage passes through zero, rectifier 30 resumes normal conduction and the field regulator resumes normal operation.

Additional circuits

A modification of the transfer circuit 55 disclosed in Figure 1 is shown in Fig. 2 enclosed by section lines connected in the motor control circuit of Fig. 1 at the terminals 54 to 61. Rectifiers 62 and 66 have been substituted for resistances 18 and 15 of the transfer circuit of Fig. 1 and resistances 63 and 67 have been added, connecting the junction of rectifiers 31 and 62 between regulated supply and ground return bus. Rectifier 66 blocks current flow from the armature voltage divider to the field regulator circuit including the remainder of the transfer circuit when the armature voltage exceeds the field feedback signal voltage, thereby isolating the field regulator circuit from the armature circuit to prevent transient armature voltages from affecting the field current regulation.

Rectifier 62 permits flow of current to the field regulator circuit from the tap of the armature voltage divider whose signal prevents excessive armature voltage during deceleration by decreasing the rate of field current build-up. Load resistor 63 has been added to provide a load in the cathode circuit of rectifier 31. Upon accelerating motor 4 from start to near base speed, maximum field feedback signal current flows from the field potentiometer source through resistor 38, rectifier 32 and parallel paths of rectifiers 31 and 66. Until near base speed, the armature voltage at the terminal 59 is lower than the field feedback signal voltage, therefore rectifier 66 will conduct. At the transfer point, potentiometer sections 9A and 9F at their midpoint, armature voltage at terminal 59 substantially equals the field feedback voltage and rectifier 32 begins to block; the voltage on the grid of the amplifier tube 20 increases, for only the current paths through rectifiers 31 and 66 remain closed. The signal path for the field feedback signal current is thereby interrupted so that the amplifier grid is temporarily controlled by the rising armature voltage. The voltage build-up at junction 68 resulting from the blocking of rectifier 32 exceeds the field feedback voltage, raising the grid voltage. The increase in conduction of the amplifier 20 due to the higher grid voltage reduces the voltage in its plate circuit, causing the signal on the grid of the rectifier of the field supply to phase back, decreasing the field current.

The current through resistor 67 now flows through the parallel path provided by the alternate loop through the portion of the field potentiometer section, included by the slider rectifier 33 to ground return via maximum potentiometer 59. Counter-clockwise rotation of the speed dial includes an increment of the active or resistive portion of the potentiometer section in the feedback circuit raising the voltage of the junction point and the grid of the amplifier 20 during the delay period; whereupon the regulator decreases the field current and field feedback voltage taken at the potentiometer 50. After the delay time of the field regulator circuit with conduction of field feedback signal resumed through rectifier 33, the circuit stabilizes having a reduced field feedback signal voltage and only a slightly higher signal voltage on the amplifier grid to maintain the rectifier 40 critical grid voltage phaseback at the new field current level. Final rise of armature voltage permits blocking of rectifier 66. Since diode 62 has not yet conducted, the regulating circuit is completely isolated from disturbing armature voltage changes.

The D. C. bias added by the potentiometer section 9F is substantially equal to the decrease in field current feedback; however, the grid of the amplifier 20 must be maintained at a level which will lower the plate circuit voltage sufficiently to decrease field supply output.

As in Fig. 1, rapid deceleration of the motor 4 requires the additional regulation to prevent excessive armature voltages controlling the rate of increasing field current. The voltage at terminal 60 derived at a lower tap on the voltage divider supplies an armature over-voltage signal taking over control of the grid of the amplifier 20 when the armature voltage exceeds its rated value by a predetermined amount, usually the safe over-voltage limit. In normal operation, rectifier 62 blocks any current tending to flow from rectifier 31 toward the armature voltage divider; however, when the armature voltage exceeds the predetermined limit, current flows through rectifier 62 from the terminal 60 raising the voltage on the amplifier grid controlling the rate of increasing field current to the rate of deceleration.

The plug-through reversal circuit remains unchanged and is not included in the transfer circuit section. A reverse polarity signal of the armature across the voltage divider is coupled to the cathode from the lower end of the divider. This negative signal lowers the cathode potential tending to decrease the field current to limit the armature voltage.

Unwarranted changes of field current are minimized at and around the transfer point by substantially the same circuit shown in Fig. 1, wherein the voltage divider including resistors 37 and 38 provide an initial positive bias voltage to the rectifier 32. The positive bias voltage preferably is adjusted to an amount approximately equal to the combined voltage drops of rectifiers 32 and 33 for the loading produced by resistors 63 on the lower portion of the armature voltage divider, resistors 16 and 17. When operating in the full field range the feedback circuit transfers from the simple field feedback circuit including a rectifier 32 to the alternate circuit including rectifier 33 and a portion of the potentiometer element 9F without an appreciable change of field current and field control will not begin until the potentiometer slider has been moved into the active second half of its resistor element. The transfer operation in reverse sequence is continued over a smooth transition as the potentiometer setting is decreased back into the armature control range.

The circuit of Fig. 3 illustrates a modification of Fig. 1 in which a voltage sensitive relay FF connected across the motor armature is provided to maintain rated field current until the armature voltage has increased, by shunting potentiometer section 9F applying simple field feedback signal voltage directly to the grid of amplifier 20 via the circuit including rectifier 75.

When the armature voltage reaches a preset value near rated base value, approximately 90% of rated armature voltage, the motor is accelerated to a speed higher than the base speed setting. Normally closed contacts FF1 and FF2 open as the relay FF picks up, introducing a resistance in series with its operating coil and raising its dropout voltage to a value slightly below that which it has picked up and reducing its differential range between pickup and dropout points. The capacitor 64 is connected across the coil to insure complete operation of the relay without chattering as the coil weakening effect is introduced. An adjustable resistor 72 is connected in series with the coil of the relay FF to adjust the relay pickup point to the desired armature voltage near base speed. The differential setting of the relay between pickup and dropout is critical during manual control of the speed dial 9 at the mid-dial setting or transfer point in both accelerating and decelerating directions. An additional delay of field strengthening during dynamic braking and plug-thru reversal is provided by the relay being connected across the armature 4A.

Armature voltage limiting is provided at the circuit including rectifier 74 connected to the armature voltage divider tap wherein conduction is transferred from rectifier 75 to rectifier 74 when the armature voltage exceeds predetermined armature over-voltage, which in turn exceeds the normal operating level of the feedback signal applied to the regulator tube grid 21. Rectifier 74 is normally blocked, the exception being during deceleration periods in which the armature voltage exceeds a predetermined limit, at which time rectifier 75 is blocked and rectifier 74 conducts, raising the grid 21 to the armature voltage at the divider tap. A resistor 76 may be connected in parallel or across the potentiometer section 9F to control the resistance to the desired amount; however, this resistor would not normally need to be adjusted during the operation but would only be used in setup procedure.

In operation, the A. C. supply 6 would be connected to the field and armature supplies and the speed dial would be rotated, moving the sliders from the downward vertical position in an upward direction, whereupon section 9A would include an increased voltage reference to increase the voltage across the armature 4A. The armature is increased in voltage until the sliders for the potentiometer sections 9A and 9F are in the position shown in Fig. 3, whereupon the armature voltage impressed across the relay winding operates the relay picking up contacts FF1 and FF2, opening the circuit, shunting potentiometer section 9F. The speed of the motor is increased past the rated base speed by including a portion of the active section of potentiometer 9F, calling for a decrease in field current through the regulator circuit. The regulator circuit is similar in operation to that of Fig. 1, in which the grid 21 controls the plate voltage of the amplifier and the D. C. voltage on the grid of rectifier 40 controlling the grid voltage of said tube. The grid voltage in turn controls the voltage across the field winding 4F.

Speed control by the use of the speed dial without the use of a relay or transfer circuit as disclosed in Fig. 1, presupposes that the rotation of the speed dial will not exceed the delay in a regulator circuit or that power would not be applied when the speed dial has a setting including a weakened field. The proper sequence for optimum control and maximum torque requires that the armature voltage be built-up to near rated value before field weakening is initiated. The inclusion of the armature voltage sensitive relay or the portion of the transfer circuit including rectifiers 32 and 33 of Fig. 1, provide maximum torque during acceleration and minimize the time period required to reach the desired speed setting.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a system for control of dynamoelectric machines, in combination, a motor having armature and field windings, armature and field regulator circuit means individual to the respective windings for sequentially varying the voltage applied to the windings from a power source, an armature voltage signal source, a field feedback signal source, a control voltage source, transfer circuit means connected between said signal sources and field regulator circuit means, said transfer circuit means including alternate circuit paths between said field signal source and field regulator circuit means wherein the second path includes said control voltage source, said transfer circuit means further including means responsive to a predetermined amplitude of armature voltage signal source to transfer from the first to said second path whereby the control voltage is added to the field feedback signal source to reduce the voltage supplied to the field in proportion to the field voltage to the field feedback signal voltage.

2. In a system for control of dynamoelectric machines, in combination, a motor having armature and field windings, armature and field regulator circuit means individual to the respective windings for sequentially controlling the voltage applied to the windings from a power source, an armature voltage signal source, a field feedback signal source, a control voltage source, transfer circuit means connected between said signal sources and field regulator circuit means, said transfer circuit means including alternate circuit paths between said field signal source and field regulator circuit means wherein the second path includes said control voltage source, said transfer circuit means further including a relay connected in parallel with said armature winding which is responsive to a predetermined amplitude of armature voltage signal to open said first path whereby the control voltage is added to the field feedback signal source in the second path to reduce the voltage supplied to the field in proportion to the field voltage to feedback signal voltage.

3. In a system for control of dynamoelectric machines, in combination, a motor having armature and field windings, armature and field regulator circuit means for sequentially varying the voltage applied to said windings from a power source, an armature voltage signal source, a field feedback signal source, a control voltage source, transfer circuit means connected between said signal sources and to the field regulator circuit means, said transfer circuit means having alternate circuit paths between said field signal source and field regulator circuit means wherein the second path includes said control voltage source, said transfer circuit means further including means responsive to a predetermined amplitude of armature voltage to transfer from the first to said second path whereby the control voltage is added to the field feedback signal source to control the field regulator circuit means and motor.

4. In a motor control system the combination comprising; a motor having armature and field windings, circuit means individual to each winding for supplying and regulating the voltage applied to said windings, an armature voltage signal source, a field feedback signal source, a transfer circuit for automatically changing control from one winding to the other winding to maintain maximum torque comprising, circuit means coupling said sources in voltage opposition and to an input of the circuit means regulating the field voltage, a unidirectional conducting device connected between said field feedback source and field regulator circuit means for conducting feedback signal current and blocking current from said armature voltage source to said feedback, said field regulator circuit means being responsive to said feedback signal voltage to maintain the desired field supply voltage until the armature voltage signal exceeds the field feedback signal voltage.

5. In a motor control system the combination comprising; a motor having armature and field windings, circuit means individual to each winding for supplying and controlling the voltage applied to said windings, an armature voltage signal source, a field feedback signal source, a transfer circuit for automatically changing control from one winding to the other winding to maintain maximum torque comprising, circuit means for coupling said sources in voltage oppositon and to the circuit means for controlling the field voltage, a unidirectional conducting device connected between said field feedback signal source and field controlling circuit for conducting feedback signal current when the feedback voltage source exceeds said armature voltage source and blocking current from said armature voltage source to said feedback, said field controlling circuit being responsive to said feedback signal voltage to maintain the desired field supply voltage until the armature voltage signal exceeds the field feedback signal voltage.

6. A motor control system comprising; a supply source, armature and field winding regulator circuits for controlling the voltage applied to said armature winding and the current through said field winding, a control input for said field regulator circuit, an armature voltage signal source, a field feedback signal source, transfer circuit means for coupling said signal sources in voltage opposition and to said control input at the junction of said sources, including alternate circuit paths for said feedback signal having unidirectional conducting devices in inverse parallel relation, a control voltage source in series with one of said devices, arranged to conduct current from said junction in one path, said feedback signal providing a limited voltage at said control input at the desired field current through the second path, said transfer circuit being responsive to the desired armature voltage at the junction to block said device in the second path whereby the field feedback circuit is transferred to the first circuit path to control the field current and said motor.

7. A motor control system comprising; a supply source, armature and field winding regulator circuits for controlling the voltage applied to said armature winding and the current through said field winding; a control input for said field regulator circuit; a source of armature voltage signals including a tapped voltage divider connected in parallel with said armature winding; a source of field feedback signals including a resistor in series with said field; transfer circuit means for coupling said signal sources in voltage opposition and to said control input at the junction of said sources including alternate circuit paths for said feedback signals having unidirectional conducting devices connected in inverse parallel relation and a variable field control voltage source in series with one of said devices arranged to conduct current from said junction in one path; said feedback signals providing a limited voltage, at said control input at the desired field current, through the second path; said transfer circuit being responsive to the armature voltage exceeding said feedback signal voltage at the junction to block said device in the second path whereby the field feedback circuit is transferred to the first circuit path to control the field current and said motor.

8. A motor control system comprising; a supply source, armature and field winding regulator circuits for controlling the voltage applied to said armature winding and the current through said field winding; a control input for said field regulator circuit; a source of armature voltage signals including a voltage divider having at least two taps connected in parallel with said armature winding; a source of field feedback signals including a resistor in series with said field, transfer circuit means for coupling said signal sources in voltage opposition, an armature voltage limiting circuit including a unidirectional conducting device coupling the resultant voltage output to said control input and a first tap on the voltage divider and arranged to block current from said tap; alternate circuit paths for said feedback signals having unidirectional conducting devices connected in inverse parallel relation, a variable field control voltage source in series with the device, arranged to conduct current from said junction in one path; said feedback signals providing a limited voltage, at said control input at the desired field current, through the second path; said transfer circuit being responsive to the armature voltage at a second higher voltage tap exceeding said feedback signal voltage at the junction to block said device in the second path whereby the field feedback circuit is transferred to the first circuit path to control the field current and the armature voltage limiting circuit controls the rise in field current.

9. A motor control system comprising; a supply source, armature and field winding regulator circuits for controlling the voltage applied to said armature winding and the current through said field winding; a control input for said field regulator circuit, an armature voltage signal source, a field feedback signal source, transfer circuit means for coupling said signal sources in voltage opposition and to said control input at the junction of said sources including a unidirectional conducting device connected between said armature voltage signal source and junction, arranged to block current to said junction; a voltage regulated current source connected to said junction; alternate circuit paths for said feedback signal having unidirectional conducting devices connected in inverse parallel relation; a control voltage source in series with one of said devices connected in parallel which is arranged to conduct current from said junction in one path, said feedback signal providing a limited voltage at said control input at the desired field current through the second path; said transfer circuit being responsive to the desired armature voltage at the junction to block said device in the second path whereby the field feedback circuit is transferred to the first circuit path to control the field current and the speed and torque of said motor.

10. A motor control system comprising; a supply source; armature and field winding regulator circuits for controlling the voltage applied to said armature winding and the current through said field winding; said field regulator circuit having control inputs, a source of armature voltage signals including a voltage divider having at least two voltage taps; a field feedback signal source; armature reversing circuit means including means for connecting a first control input to the lower end of the divider and a common return path for the system through a unidirectional conducting device arranged to block reverse currents in said divider; transfer circuit means for coupling said signal sources in voltage opposition and to a second control input at the junction of said sources including alternate circuit paths for said feedback signal having unidirectional conducting devices in inverse parallel relation and a control voltage source in series with the device arranged to conduct current from said junction in one path; said feedback signal providing a limited voltage at said second control input, at the desired field current, through the second path; said transfer circuit being responsive to the desired armature voltage at the junction to block said device in the second path whereby the field feedback circuit is transferred to the first circuit path to control the field current and the reversing circuit means limits the armature voltage by controlling the field current during rotational reversals.

11. In a motor control system the combination comprising; a motor having armature and field windings, circuit means individual to each winding for supplying and controlling the voltage applied to said windings; an armature voltage source and a field feedback signal source; a transfer circuit for automatically changing control from one winding to the other winding to maintain maximum torque comprising, circuit means for coupling said sources in voltage opposition wherein the resultant voltage at the junction is coupled to a control input of the circuit controlling the field voltage, alternate circuit paths between said feedback source and said input, a unidirectional conducting device connected in one path for conducting feedback current to said input, a second unidirectional conducting device for conducting current from said junction, and a control voltage source in the second path opposing the voltage at the junction and aiding said feedback signal, said field control circuit being responsive to said feedback signal voltage to maintain the desired field supply voltage until the armature voltage signal exceeds the field feedback signal voltage whereupon the voltage applied to said field winding is decreased with increased control voltage.

12. In a motor control system the combination comprising; a motor having armature and field windings, circuit means individual to each winding for supplying and controlling the voltage applied to said windings, an armature voltage source and a field feedback signal source for deriving voltages which are a function of the armature voltage and the field current respectively; a transfer circuit for automatically changing control from one winding to the other winding to maintain maximum torque comprising circuit means for coupling said sources in voltage opposition wherein the resultant voltage at the junction is coupled to a control input of the circuit controlling the field voltage, alternate circuit paths between said feedback source and said input, a unidirectional conducting device connected in one path for conducting feedback current to said input, a second unidirectional conducting device for conducting current from said junction and a control voltage source in the second path opposing the voltage at the junction and aiding said feedback signal, said field control circuit being responsive to said feedback signal voltage to maintain the desired field supply voltage until the armature voltage signal exceeds the field feedback signal voltage whereupon the voltage applied to said field winding is decreased with increased control voltage.

13. In a motor control system the combination comprising; a motor having armature and field windings, circuit means individual to each winding for supplying and controlling the voltage applied to said windings, an armature voltage source and a field feedback signal source; a transfer circuit for automatically changing control from one winding to the other winding to maintain maximum torque; comprising circuit means for coupling said sources in voltage opposition and the resultant voltage at the junction to a control input of the circuit for controlling the field voltage; alternate circuit paths between said feedback source and said input, a rectifier connected in one path for conducting feedback current to said input, a second rectifier for conducting current from said junction and a control voltage source in the second path opposing the voltage at the junction and aiding said feedback signal, a voltage divider connected across said control voltage source having one section of said divider in series in said first path between said rectifier and feedback source wherein the combined forward voltage drop across said rectifiers is substantially equal to the voltage across said divider, said field control circuit being responsive to said feedback signal voltage to maintain the desired field supply voltage until the armature voltage signal exceeds the field feedback signal voltage whereupon the voltage applied to said field winding is decreased with increased control voltage.

References Cited in the file of this patent

UNITED STATES PATENTS 2,504,155  Roman ---------------- Apr. 18, 1950